Patented Feb. 26, 1924.

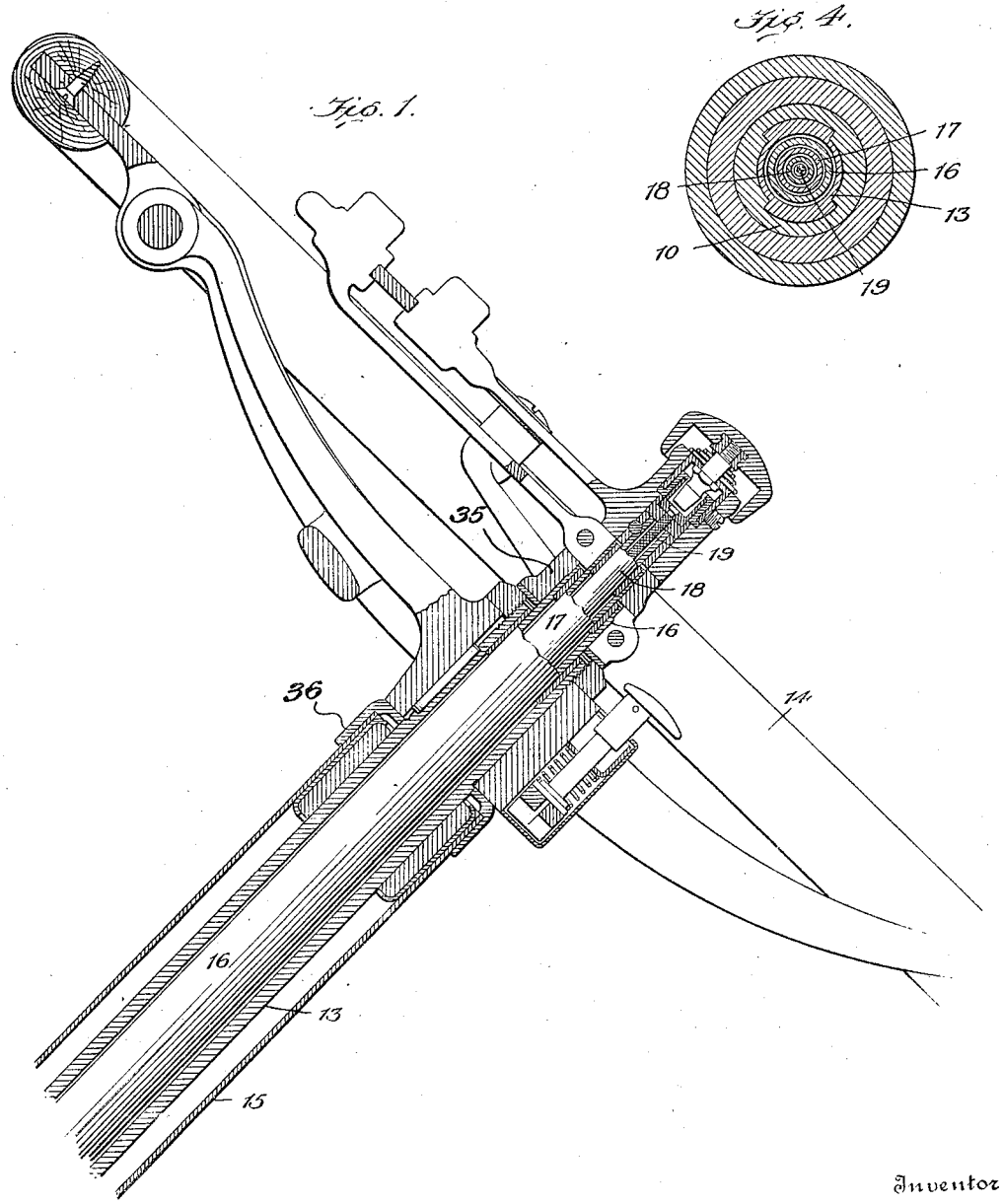

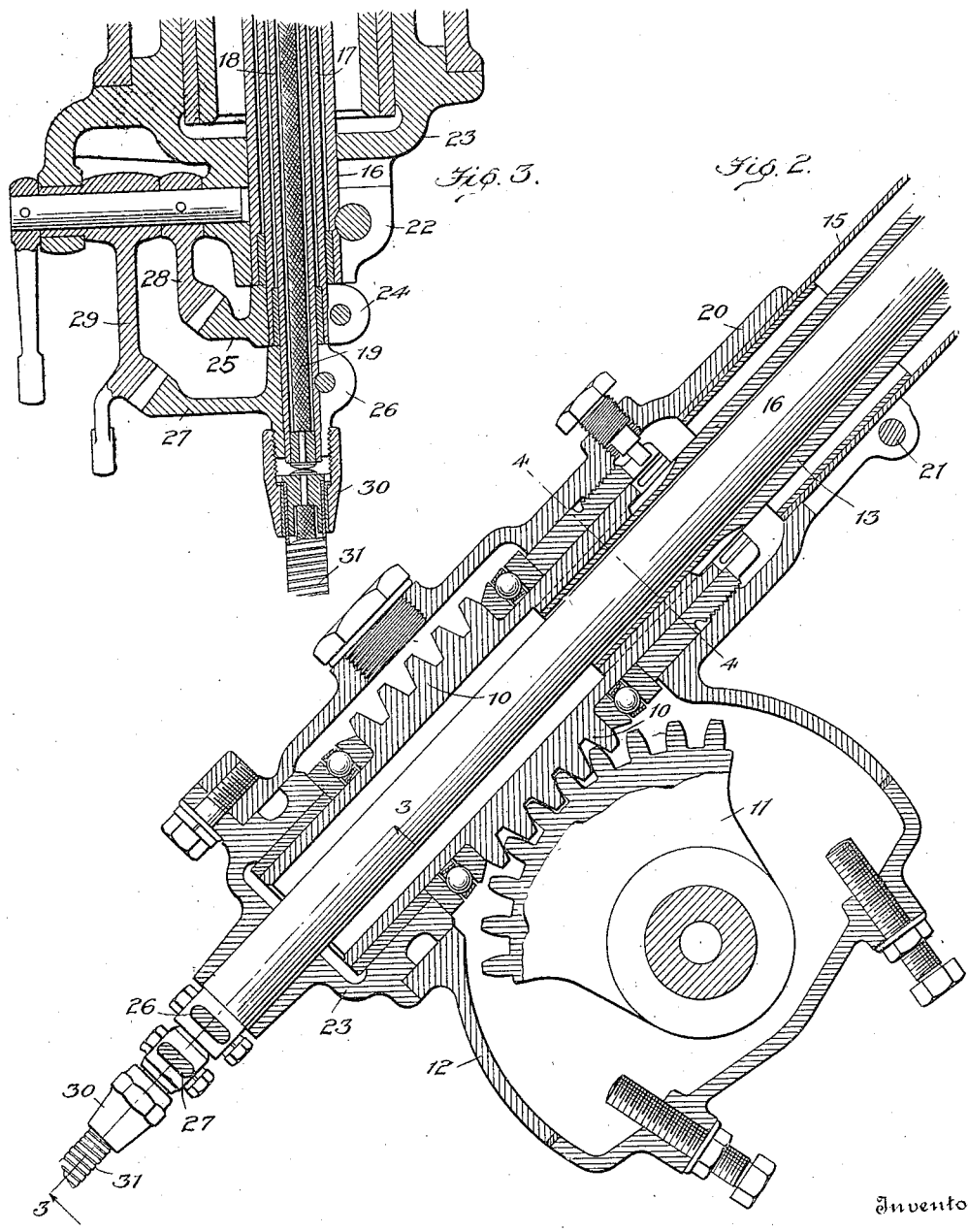

1,484,729

UNITED STATES PATENT OFFICE.

GEORGE L. McCAIN, OF DETROIT, MICHIGAN, ASSIGNOR, BY MESNE ASSIGNMENTS, TO HAROLD H. EMMONS, OF DETROIT, MICHIGAN.

STEERING MECHANISM FOR AUTOMOBILES.

Application filed October 2, 1919. Serial No. 327,836.

*To all whom it may concern:*

Be it known that I, GEORGE L. McCAIN, a citizen of the United States, and residing at Detroit, county of Wayne, State of Michigan, have invented certain new and useful Improvements in Steering Mechanism for Automobiles, of which the following is a specification.

It is the object of this invention to provide steering mechanism for automobiles in which the various parts are so designed and constructed that the steering column, including the throttle controlling shaft, the spark controlling shaft, and the horn connections, can be readily removed from that portion of the mechanism which is secured to the chassis.

In automobile construction the body portion is made separable from the chassis being usually removably secured thereto by means of bolts. In placing the body upon the chassis at the factory, and in subsequently removing and replacing the body for the purpose of repair, for shipment, or in exchanging a winter body for a summer body, it has been found necessary to remove the steering column, which extends from the chassis up through an aperture in the body, when the body and chassis are completely assembled.

Hitherto the removal of the steering column has not been an operation easily accomplished, but has involved considerable time and work, delaying the operation of removing the body and replacing the same. In my improved construction the steering column and the portion of the steering mechanism attached to the chassis are so secured together that by loosening a few bolts, which are quite accessible, the former may be quickly detached from the latter and removed from the car, and as quickly replaced when desired.

In the drawings:

Figure 1 is a longitudinal section of the upper portion of the steering column;

Figure 2 is a longitudinal section through the lower portion of the steering column;

Figure 3 is a section on the line 3—3 of Figure 2; and

Figure 4 is a section on the line 4—4 of Figure 2.

The steering column is of the type now in common use in automobile construction comprising usually four concentric tubes or shafts surrounded by a casing and having the horn connection, that is, the wire connecting the push button controlling the horn and the horn itself, extending through the innermost tube of the column. At their lower ends the various members mentioned are detachably secured to the members permanently fastened to the chassis with which they normally cooperate.

The usual casing for the worm 10 and segment 11 is indicated at 12 in the drawings, and this casing is fastened in some suitable manner to the chassis of the automobile. The worm 10 is tubular and the steering shaft or tube 13 extends into its upper end in such manner that the worm may be said to be splined on the steering shaft. In Figure 4 are clearly illustrated the inter-engaging portions of the worm and steering shaft, which are so designed that the shaft and worm are freely relatively movable longitudinally but must rotate together. To the upper end of the steering shaft 13 a steering wheel 14 is keyed in the usual manner. Concentric with the steering shaft 13 are outer casing 15, inner stationary shaft 16, throttle controlling shaft 17 and spark controlling shaft 18. Extending downwardly through the inner or spark controlling shaft 18 is the cable 19 which connects the push button on the top of the steering column with the horn, not shown. The outer casing 15 enters at its lower end a split collar 20 where it is securely held by tightening bolt 21. The steering shaft as explained before, engages the worm 10, while the stationary shaft 16, the throttle shaft 17 and the spark shaft 18 all extend through the hollow worm and, with the exception of the stationary shaft 16, project downwardly past the lower end of the casing 12. The hollow shaft 16 is detachably secured in position by a split collar 22 which comprises a portion of the lower end of a cap 23 secured to the casing 12. The throttle shaft is secured against upward movement by means of a split collar 24 which is part of a segment 25 and the spark shaft is secured against upward movement by means of a split collar 26 which is integral with segmental gear 27. Segmental gears 25 and 27 cooperate with segmental gears 28 and 29, respectively, and mechanism attached thereto, in adjusting the throttle and spark.

A coupling 30 detachably secures the cable 19 to the cable 31 directly connected to the horn.

The usual segment 35 is detachably though rigidly secured to the upper end of the stationary shaft 16 and this constitutes an abutment preventing outward and upward movement of the steering wheel. The stationary casing 15 terminates in an annular cap 36 which constitutes an abutment preventing inward and downward movement of the steering wheel. These abutments prevent longitudinal movement of the shaft 13 at all times so long as the stationary shafts 15 and 16 are attached to the casing 12. When these shafts have been detached from the casing, however, and the spark and throttle operating shafts detached at their lower ends, the column may be removed in its entirety.

From the above description it will be seen that each of the component members of the steering column is so secured to the portion of the steering mechanism which is fast to the chassis that by simply loosening four easily manipulated bolts, and by disconnecting the horn connection, the entire steering column can be removed. The various members can be again quickly secured in position.

It will also be apparent that various changes can be made in the invention and I therefore do not limit myself to the exact details of construction described.

Having thus described the invention what is claimed as new and desired to be secured by Letters Patent is:

1. In a steering mechanism for automobiles, in combination, a casing, a worm rotatably mounted in the casing, a steering shaft engaging the worm in such manner that the worm is rotatable with the shaft and the shaft may be freely withdrawn in the direction of its length from engagement with the worm, and a stationary shaft concentric with the rotatable shaft and detachably secured at its lower end to the said casing, said stationary shaft having means thereon constituting an abutment preventing the steering shaft from moving out of engagement with the worm until the stationary shaft is disengaged from the casing.

2. In a steering mechanism for automobiles, in combination, a casing, a worm rotatably mounted in the casing, a steering shaft engaging the worm in such manner that the worm is rotatable with the shaft and the shaft may be freely withdrawn in the direction of its length from engagement with the worm, a steering wheel fixed on the upper end of said rotatable shaft, and a stationary shaft concentric with and lying within the rotatable shaft, said stationary shaft being detachably secured at its lower end to said casing and having means at its upper end for engaging the steering wheel to prevent the wheel and steering shaft from moving upwardly until the stationary shaft is detached from the casing.

3. In a steering mechanism for automobiles, in combination, a casing, a worm rotatably mounted in the casing, a steering shaft engaging the worm in such manner that the worm is rotatable with the shaft and the shaft may be freely withdrawn in the direction of its length from engagement with the worm, a steering wheel fixed on the upper end of said shaft, two stationary shafts concentric with said steering shaft, one lying within the steering shaft and a second lying without the steering shaft, each of said stationary shafts having abutment means adjacent its upper end, the steering wheel hub lying between said abutments whereby the steering shaft is held against disengagement with the worm except when the stationary shafts are disconnected from the casing.

In testimony whereof I affix my signature.

GEORGE L. McCAIN.